W. F. OSBORNE.
Manufacturing Buckles.

No. 9,600. Reissued March 8, 1881.

Attest:
J. Henry Kaiser
J. A. Rutherford

Inventor:
Wilbur F. Osborne,
By James L. Norris.
Atty

N. PETERS, PHOTO-LITHOGRAPHER, WASHINGTON, D. C.

UNITED STATES PATENT OFFICE.

WILBUR F. OSBORNE, OF ANSONIA, CONNECTICUT.

MANUFACTURING BUCKLES.

SPECIFICATION forming part of Reissued Letters Patent No. 9,600, dated March 8, 1881.

Original No. 207,769, dated September 3, 1878. Application for reissue filed November 4, 1880.

*To all whom it may concern:*

Be it known that I, WILBUR F. OSBORNE, a citizen of the United States, residing at Ansonia, in the county of New Haven and State of Connecticut, have invented a new Improvement in Buckles; and I do hereby declare the following, when taken in connection with the accompanying drawings and the letters of reference marked thereon, to be a full, clear, and exact description of the same, and which said drawings constitute part of this specification, and represent, in—

Figure 1:
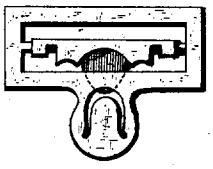
Figure 3:
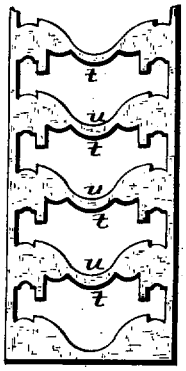
Figure 2:
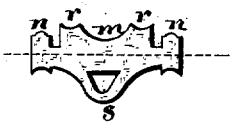
Figure 4:
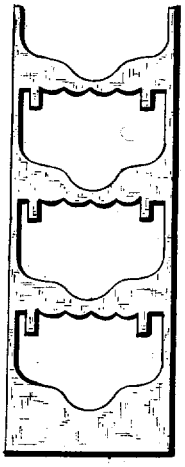
Figure 5:
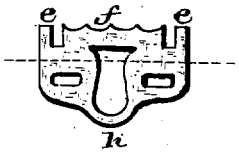
Figure 6:
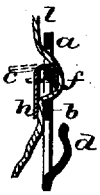

Figure 1, a front view of the buckle with improved lever; Fig. 2, the lever detached and flat; Fig. 3, a diagram illustrating the method of cutting; Fig. 4, diagram of method of cutting the lever as heretofore constructed; Fig. 5, the lever as cut according to Fig. 4; Fig. 6, vertical section through the buckle, with the strap engaged.

This invention relates to an improvement in the manufacture of buckles commonly called "suspender-buckles," and which consist of a frame with a lever or tongue hinged therein, one arm of which serves as a means for turning the lever, and the other for engaging the strap, as seen in Fig. 6, in which *a* represents the upper bar, *b* the lower bar, and *c* the intermediate bar, of the frame, the lower bar extended and provided with a hook, *d*, with which to engage the brace of the suspender.

The levers or tongues as heretofore made are successively cut from sheet metal, as seen in Fig. 4, Fig. 5 showing the lever so cut. This lever is doubled on the broken line, and the two tongues *e* bent around the said central bar to secure the lever thereon. The serrated edge *f* turns to the front, the reverse edge or end *h* to the back, forming a handle by which to turn the lever, as indicated in broken lines, Fig. 6, to free the strap, and also to bear against the strap when set, as seen in Fig. 6, so that the serrated edge *f* will engage the strap *l*. This construction is common and well known.

The object of this invention is to construct the tongue so as to make a great saving of metal; and it consists, first, in providing a buckle with a sheet-metal tongue or lever, having in its holding-edge a recess corresponding in depth and position, approximately, to a handle which projects from its opposite edge, substantially as and for the purpose hereinafter specified.

It also consists in a sheet-metal buckle tongue or lever folded from a blank, having in its holding-edge a central recess, with holding-teeth on both sides of the recess, for the purpose of saving metal in its manufacture, and provided with suitable bearings for embracing the intermediate bar of a buckle-frame, as hereinafter more fully described.

It consists, further, in an improved method of manufacturing sheet-metal buckle tongues or levers, said method consisting in cutting the lever or tongue blank from a strip of sheet metal, with a recess in its holding-edge, whereby a saving of metal is effected.

The lever, as shown in Fig. 2, has tongues *n* on one edge, to secure it upon the bar in the usual manner. Between these tongues is the engaging portion of the lever. In the center is a deep depression or cut, *m*, forming, practically, projections *r* at each side, which are the engaging prongs or edges of the lever. On the opposite edge there is the usual projection, *s*, to form the handle or stop for the lever. By this peculiar shape of the buckle the blanks may be cut as seen in the diagram, Fig. 3.

The recess *m* on the holding-edge of the lever leaves the metal as at *t*, so that the handle or stop *s* may extend down within the line of the holding-edge of the lever, as at *u*. By this peculiar shape of lever a very large per cent. of the metal is saved, however the blanks are cut, and consequently the cost of the buckle is proportionately reduced.

The lever or tongue, it will be observed, is reduced to a mere skeleton by cutting the recess from its holding-edge at or about the center, with holding-teeth on both sides of the central recess, and it is, therefore, besides the saving of metal, very light and convenient to handle, while at the same time the extent of edge that gripes the suspender is amply sufficient, and does not tear or deface the center of the suspenders and the embroidery which is frequently worked upon them.

What I claim is—

1. In a buckle, the sheet-metal tongue or lever, having in its holding-edge a recess corresponding in depth and form, approximately, to a handle which projects from its opposite edge, substantially as and for the purpose specified.

2. In a buckle, the sheet-metal tongue or lever, having in its holding-edge a central recess, and holding-teeth on each side of said recess, and provided with suitable bearings for connecting with the bar of the buckle, substantially as and for the purpose herein set forth.

3. The herein-described improvement in the method of manufacturing buckle-levers, consisting in cutting the lever-blank from a strip of sheet metal, with a recess in its holding-edge, corresponding with a handle on its opposite edge, substantially as described.

In testimony whereof I have hereunto set my hand in the presence of the subscribing witnesses.

WILBUR F. OSBORNE.

Witnesses:
FRANKLIN BURTON,
EDW. L. SMITH.